(12) United States Patent
Wu

(10) Patent No.: US 6,359,778 B1
(45) Date of Patent: Mar. 19, 2002

(54) REMOVABLE-TYPE HARD DISK DRIVE BI-DIRECTIONAL INGRESS AND EGRESS STRUCTURE

(76) Inventor: Wen-Kao Wu, P.O. Box No. 6-57, Chung-Ho City, Taipei Hsien 235 (TW)

( * ) Notice: Subject to any disclaimer, the term of this patent is extended or adjusted under 35 U.S.C. 154(b) by 9 days.

(21) Appl. No.: 09/659,331

(22) Filed: Sep. 12, 2000

(51) Int. Cl.[7] .................................................. G06F 1/16
(52) U.S. Cl. ........................ 361/685; 361/679; 361/683; 361/684; 361/685; 361/686; 361/724; 361/725; 361/726; 361/727; 361/747; 312/223.1; 312/223.2; 439/357; 439/358; 439/488; 439/490; 439/491
(58) Field of Search .......................... 361/679, 683–686, 361/724–727, 747; 439/357, 358, 488, 490, 491; 312/223.1, 223.2

(56) References Cited

U.S. PATENT DOCUMENTS

| | | | | |
|---|---|---|---|---|
| 5,359,492 A | * | 10/1994 | Porter | 361/683 |
| 6,052,278 A | * | 4/2000 | Tanzer et al. | 361/685 |
| 6,178,086 B1 | * | 1/2001 | Sim et al. | 361/683 |

* cited by examiner

Primary Examiner—Leo P. Picard
Assistant Examiner—Yean-Hsi Chang

(57) ABSTRACT

A removable-type hard disk drive bi-directional ingress and egress structure consisting of a connecting rod conjoined to the lower extent of a rotating shaft, with the other end conjoined to upper extent of another rotating shaft and thereby enabling opposite angles between the two upper and lower rotating shafts. When any single rotating shaft of the two upper and lower rotating shafts is selectively positioned by an extended handle, a tabular projection and two protruding catch hooks of a rotating shaft are utilized to coordinate the revolving of the rotating shafts by the handle such that the opposing action generated by the two upper and lower rotating shafts achieve a balanced ingress and egress effect at both the left and right sides. When the handle is pressed into closure, the catch hooks protrude due to the revolving of the rotating shafts and enables the drive housing to engage a replacement frame. When the handle is pulled open, since the rotating shafts and the connecting rod operate synchronously, the catch hooks are released from the check holes of the replacement frame, allowing flexible and efficient hard disk drive removal and installation under conditions of equalized force.

1 Claim, 6 Drawing Sheets

REMOVABLE-TYPE HARD DISK DRIVE BI-DIRECTIONAL INGRESS AND EGRESS STRUCTURE

BACKGROUND OF THE INVENTION

1) Field of the Invention

The invention herein relates to a removable-type hard disk drive bi-directional directional ingress and egress structure, specifically a kind having a two-sided synchronous ingress and egress replacement frame that enables efficient operation and, furthermore, an engagement structure in which jamming is not easily induced.

2) Description of the Prior Art

Conventional hard disk drives are often engaged onto replacement frames by fixing their catch hooks to the sides of drive housings, as indicated in FIG. 1, a conventional hard disk drive engagement structure. A conventional hard disk drive 1 is equipped with projecting catch hooks 11, with the said catch hooks 11 conjoined to the pull handle 12 at the front extent of the hard disk drive 1 such that when the hard disk drive I is placed into the replacement frame, the said catch hooks 11 are engaged into the check holes of the replacement frame to achieve mounting; when they are taken out, the pull handle 12 is tugged back to slant and thereby release the catch hooks 11 from the check holes to facilitate the removal of the hard disk drive 1; since the catch hooks 11 of such conventional structures are uni-directional engagement units (i.e., have a uni-directional force vector), this results in an imbalance of force that not only results in inefficient operation, but also produces less than ideal mechanical component jamming; since this shortcoming has long afflicted and troubled manufacturers as well as consumers, a removable-type hard disk drive bi-directional ingress and egress structure of increased practical value among such products is truly needed, which is the motivation of the invention herein.

SUMMARY OF THE INVENTION

Therefore, the primary objective of the invention herein is to provide a removable-type hard disk drive bi-directional ingress and egress structure consisting of a rotating shaft with a connecting rod at its lower extent, the opposite end of which is conjoined to the upper extent of another rotating shaft, enabling thereby an opposite angle between the two upper and lower rotating shafts and, furthermore, when any single rotating shaft of the two upper and lower rotating shafts is selectively positioned by an extended handle, a tabular projection and two protruding catch hooks of a rotating shaft are utilized to coordinate the revolving of the rotating shafts by the handle such that the opposing action generated by the two upper and lower rotating shafts achieve a balanced ingress and egress effect at both the left and right sides; when the handle is pressed into closure, the catch hooks respectively engage the check holes of the replacement frame and when the handle is pulled open, since the rotating shafts and the connecting rod operate synchronously, the catch hooks are released from the check holes of the replacement frame, allowing flexible and efficient hard disk drive removal and installation under conditions of equalized force.

To enable a further understanding of the main features of the invention herein and its original innovations, the brief description of the drawings below are followed by the detailed description of the embodiments.

DETAILED DESCRIPTION OF THE EMBODIMENTS

Figure 1:
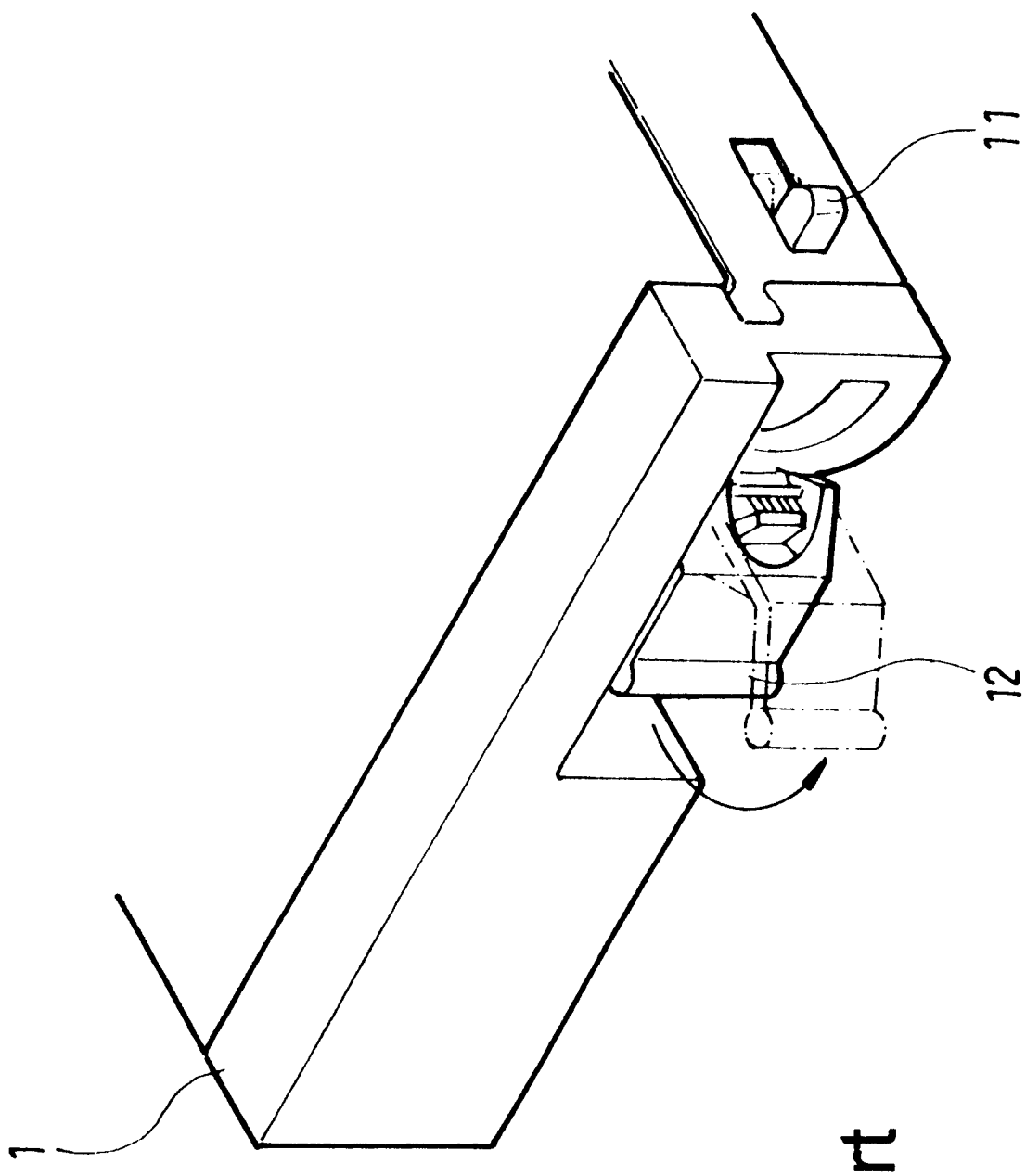
FIG. 1 is an isometric drawing of a conventional hard disk drive engagement structure.
Figure 2:
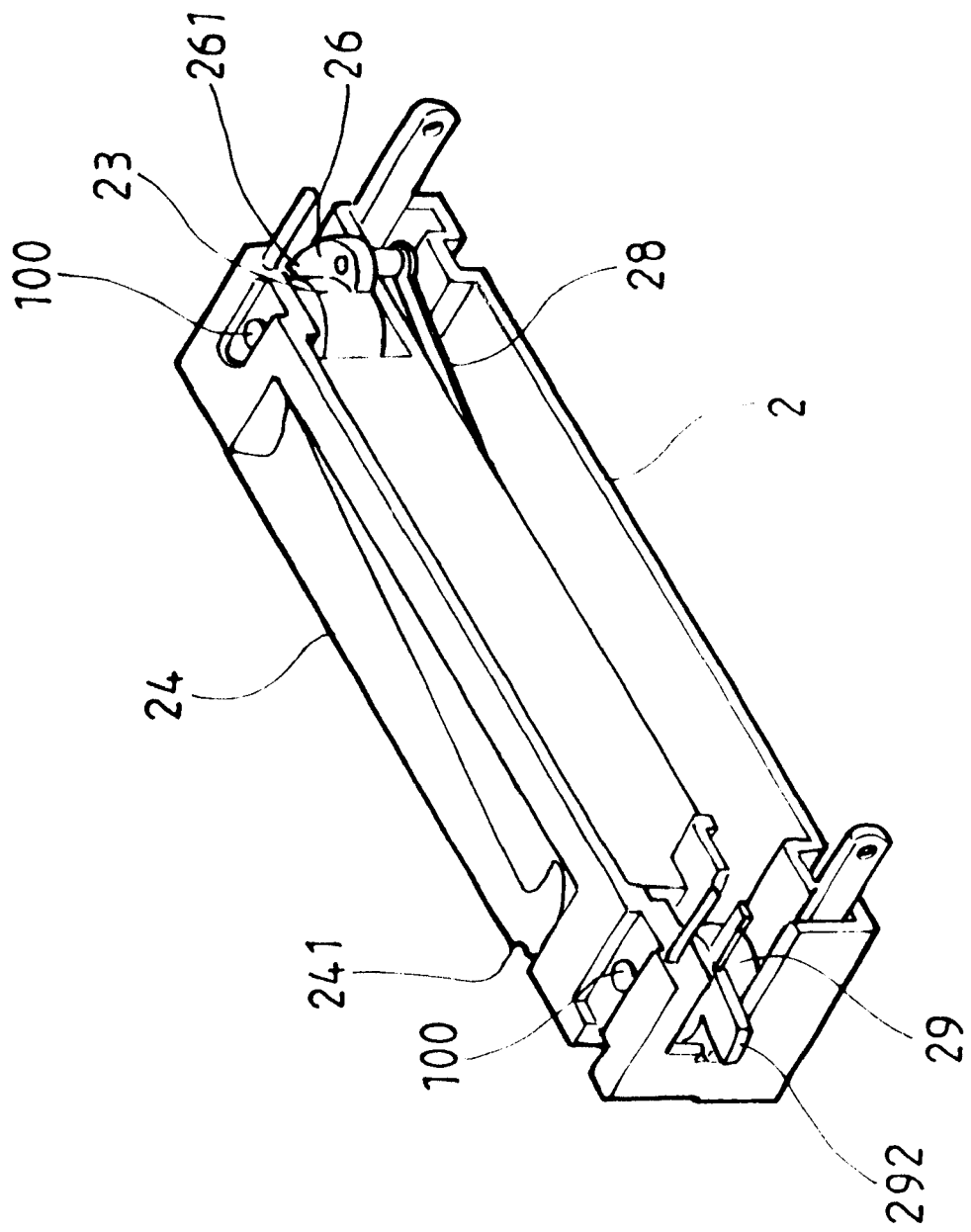
FIG. 2 is an isometric drawing of the invention herein.
Figure 3:
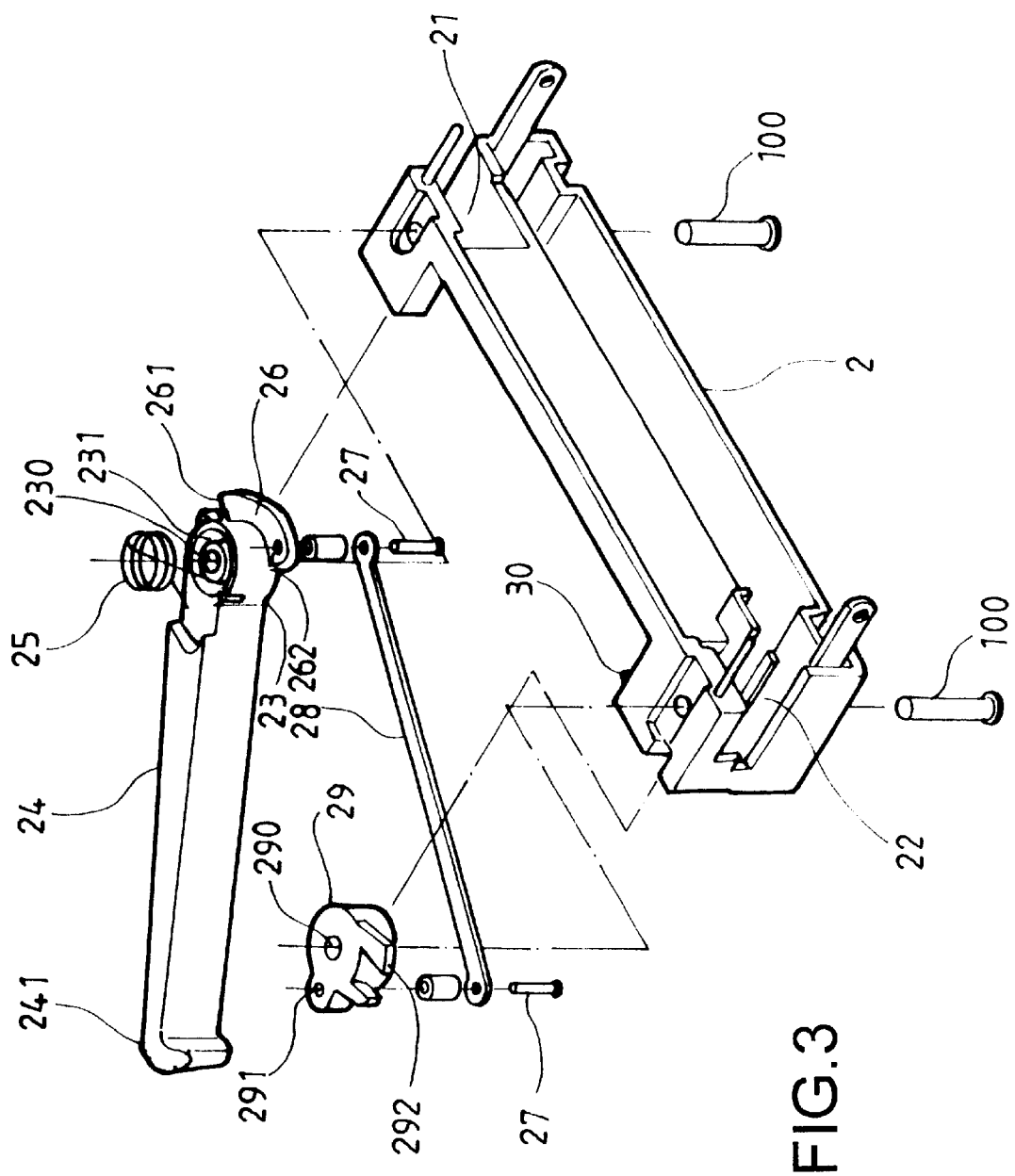
FIG. 3 is an exploded drawing of the invention herein.

Referring to FIG. 2 and FIG. 3, the isometric and exploded drawing of the present invention, the invention herein consists of a hard disk drive drive housing 2 having sleeve slots 21 and 22 respectively disposed in the two sides of the front end such that a rotating shaft 23 of a handle 24 is slipped in from the front of one end, wherein the said rotating shaft 23 has a round recess 231 that provides for the placement of a spring 25, and extending from the periphery of the rotating shaft 23 is a tabular projection 26 and formed in the said tabular projection 26 is a catch hook 261 and a through-hole 262; after a mounting tie 27 is inserted into the said through-hole 262 and fastened to a connecting rod 28, the other end of the said connecting rod 28 is coupled to a through-hole 291 on the periphery of another rotating shaft 29 and, furthermore, the said rotating shaft 29 has disposed a catch hook 292 similar to that of the rotating shaft 23, enabling the two ends of the connecting rod 28 to be pivotably conjoined to the upper and lower extent of the rotating shafts 29 and 23, respectively; furthermore, the centers of the rotating shafts 29 and 23 enable the pivotable conjoinment of the two ends of the connecting rod 28 at opposite angles relative to the lateral aspect of the centers such that after the two rotating shafts 29 and 23 are respectively slipped into the sleeve slots 21 and 22 of the drive housing 2, a mounting pin 100 is inserted into the mounting holes 230 and 290 at the centers of the rotating shafts 29 and 23 to mount them to the drive housing 2.

A step section 241 is disposed on the surface at the other end of the said rotating shaft 23 handle 24 and, furthermore, a tensile latching component 30 is situated at one side of the front opening of the said drive housing 2 such that when the handle 24 is pressed in, the latch component 30 engages the handle 24 and the catch hooks 261 and 292 protrude from the two sides of the drive housing 2 due to the revolving of the rotating shafts 23 and 29, thereby providing for engagement in the replacement frame 4 check holes 41, and when the latch component 30 is pulled outward during removal and the handle 24 is pushed open due to the elasticity of the spring 25, the catch hooks 261 and 292 of the rotating shafts 23 and 29 then recede into the drive housing 2 as a result of the revolving, enabling release from the replacement frame 4 check holes 41 that facilitates hard disk drive removal such that the hard disk drive is smoothly placed in or taken out in an operation that is flexible and, furthermore, with reduced mechanical component wear because the force against the two sides is equalized.

Figure 4:
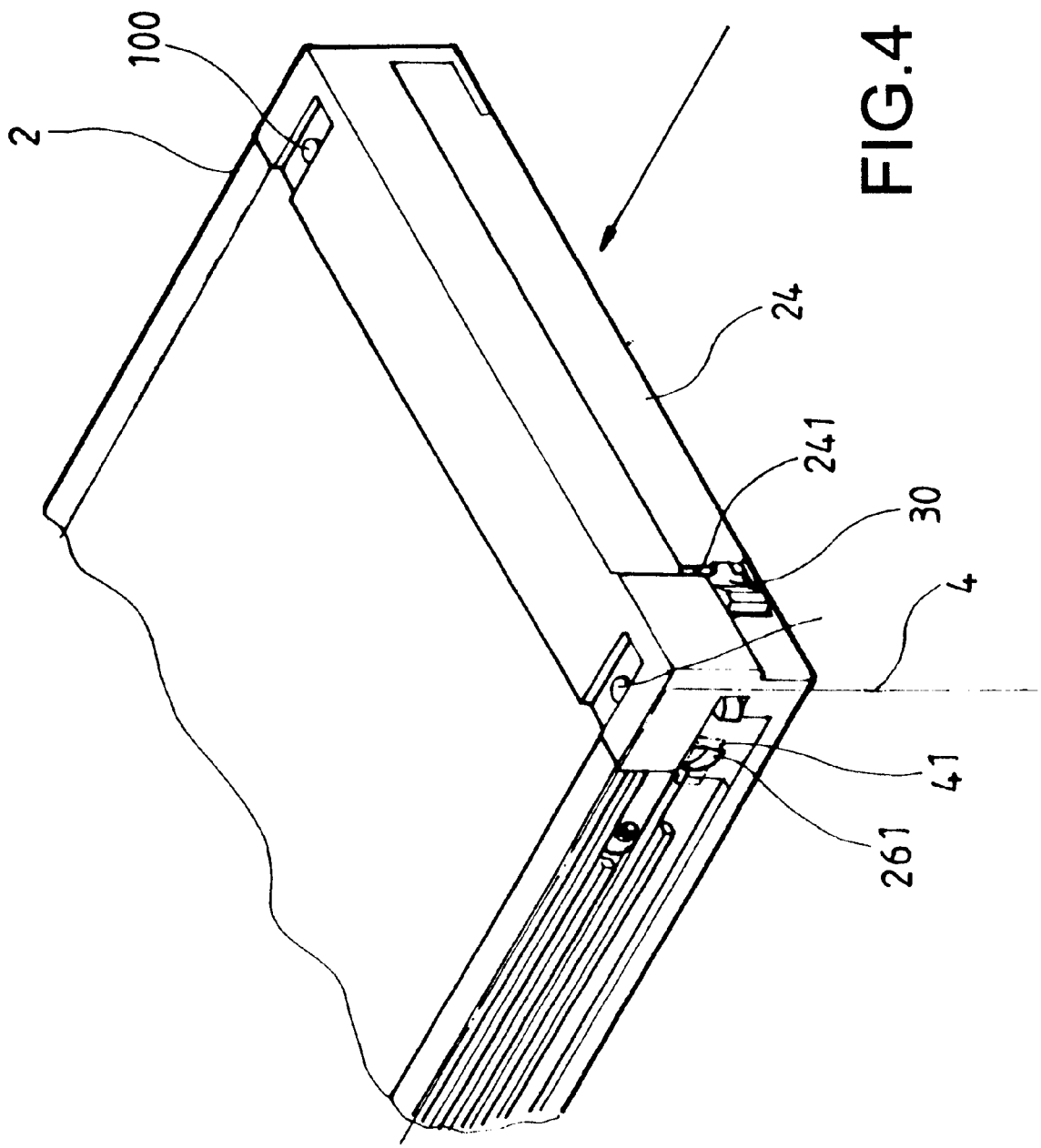
FIG. 4 is an isometric drawing of an application embodiment of the invention herein.
Figure 6:
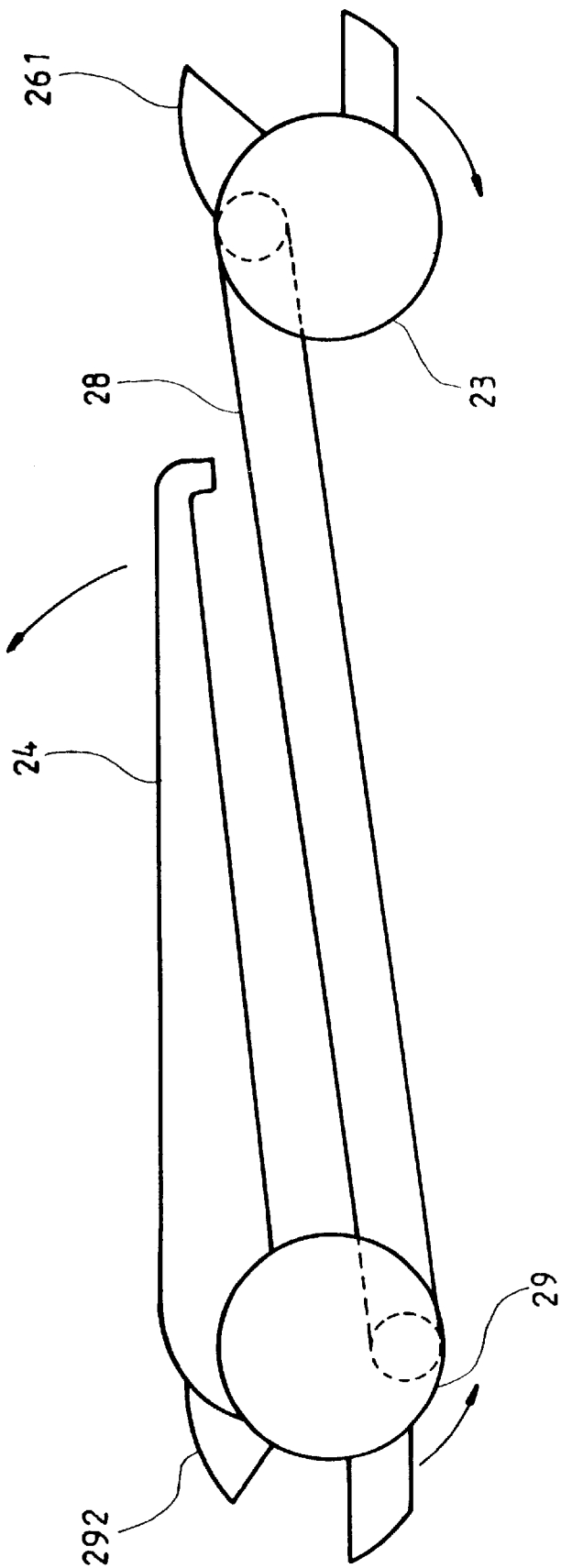
FIG. 6 is an orthographic drawing of an operational embodiment of the invention herein.

Referring to FIG. 4 and FIG. 6, the utilization and operational embodiments of the present invention, when the handle 24 of the invention herein is in a state of pressured closure, the drive housing 2 latch component 30 engages the step section 241 of the handle 24 causing it to be secured and the catch hooks 261 and 292 protrude outward such that after the drive housing 2 is slid into the replacement frame 4, they are engaged in the check holes 41 and the drive housing 2 is secured onto the replacement frame 4.

Figure 5:
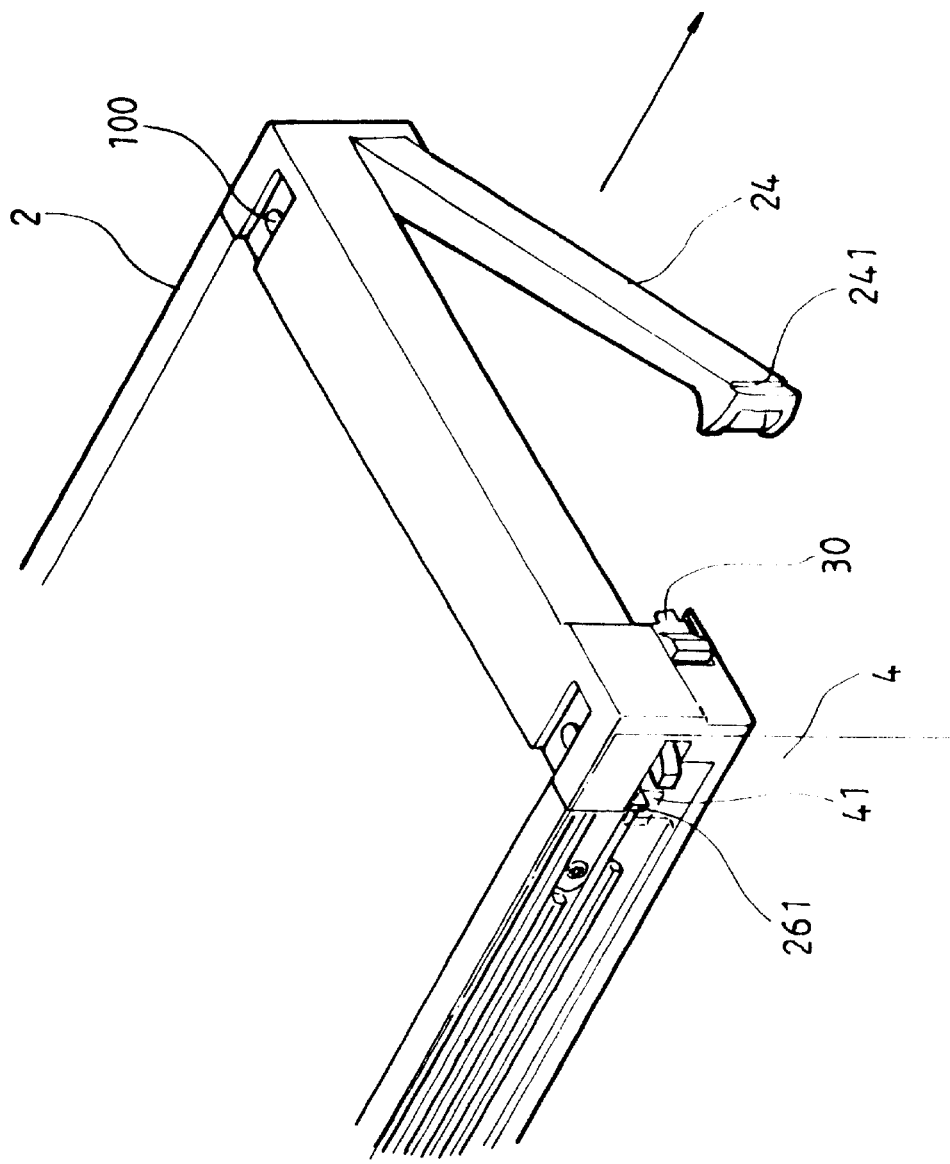
FIG. 5 is an isometric drawing of a utilization embodiment of the invention herein.

Referring to FIG. 5 and FIG. 6, the utilization and operational embodiments of the present invention, when the drive housing 2 is removed, it is only necessary to the pull outward on the drive housing 2 latch component 30, which releases the step section 241 of the handle 24 and allows the handle 24 to open outward due to the tensile force of the spring 25, thereby causing the rotating shafts 23 and 29 to revolve a certain angle, resulting in the release of the catch hooks 261 and 292 from the replacement frame 4 check holes 41 and enabling the efficient sliding out of the drive housing 2.

In summation of the foregoing section, since the invention herein has the catch hooks 261 and 292 of the rotating shafts 23 and 29 that are coordinated with the handle 24 to enable hard disk drive ingress and egress into or from the replacement frame 4 in an operation that is even more efficient and flexible and, furthermore, the force is equalized to reduce to mechanical component jamming, the present invention is of a practical design which is an original innovation that is lawfully submitted to the Patent Bureau for review and the granting of the commensurate patent rights.

What is claimed is:

1. A removable-type hard disk drive bi-directional ingress and egress structure consisting of a handle situated at a front end of a hard disk drive, a rotating shaft disposed at one end of said handle, a tabular projection extending from periphery of said rotating shaft, a catch hook and a through-hole formed in said tabular projection, a connecting rod fastened via said through-hole to another rotating shaft at an opposite side of a drive housing, and said rotating shaft has disposed a catch hook; when said handle is pressed into closure or pulled opened, said connecting rod revolves said rotating shafts which cause said catch hooks of said rotating shafts to protrude from or recede into said drive housing, thereby triggering engagement to or release from replacement frame check holes and enabling efficient and flexible hard disk drive ingress and egress into or from said replacement frame.

\* \* \* \* \*